United States Patent

Tamvada et al.

(10) Patent No.: US 9,621,737 B2
(45) Date of Patent: Apr. 11, 2017

(54) ABUSE DETECTION FOR PHONE NUMBER LOOKUPS

(71) Applicant: Google Inc., Mountain View, CA (US)

(72) Inventors: Radhika Tamvada, Bothell, WA (US); Kobi Isaac Reiter, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/837,642

(22) Filed: Aug. 27, 2015

(65) Prior Publication Data
US 2017/0064090 A1 Mar. 2, 2017

(51) Int. Cl.
*H04M 1/56* (2006.01)
*H04M 15/00* (2006.01)
*H04W 8/20* (2009.01)
*H04M 15/06* (2006.01)
*H04M 3/42* (2006.01)

(52) U.S. Cl.
CPC ......... *H04M 15/755* (2013.01); *H04M 15/61* (2013.01); *H04W 8/20* (2013.01)

(58) Field of Classification Search
CPC .. H04M 1/1575; H04M 15/61; H04M 15/755; H04M 3/42059; H04M 3/42068; H04W 8/20; H04Q 3/72
USPC ..................................................... 379/142.06
See application file for complete search history.

(56) References Cited

U.S. PATENT DOCUMENTS

| 7,440,746 | B1 * | 10/2008 | Swan | H04M 3/42365 455/412.1 |
| 2007/0049298 | A1 * | 3/2007 | Jhuang | H04M 3/4931 455/458 |
| 2016/0063054 | A1 * | 3/2016 | Thompson | G06Q 30/0203 705/7.32 |

OTHER PUBLICATIONS

International Search Report and Written Opinion of the International Searching Authority for International Application No. PCT/US2016/044894, dated Sep. 23, 2016, 9 pgs.

* cited by examiner

*Primary Examiner* — Huy C Ho
(74) *Attorney, Agent, or Firm* — Patent Law Works LLP

(57) ABSTRACT

A system and method for rate-limiting phone number lookups. An account look-up application receives an address book of a first user, the address book including a phone number that belongs to a second user, creates a phone edge by associating the phone number in the address book with an account of the second user, receives a request including the phone number from the first user for obtaining the account associated with the phone number, determines an edge cost associated with the phone edge for the first user, determines whether to provide the phone edge to the first user based on the edge cost, and provides the phone edge to the first user responsive to a positive determination.

20 Claims, 9 Drawing Sheets

ABUSE DETECTION FOR PHONE NUMBER LOOKUPS

BACKGROUND

The specification relates to information search. In particular, the specification relates to rating a request for obtaining an account via a phone number and determining whether to provide information of the account to a user based on the rating.

Technology makes communications between people easy and fast. For example, people can chat over phone or talk with each other over a social network. A person can exchange phone numbers with a friend, receive a call from an acquaintance, find a phone number of an insurance company from an insurance card, obtain a store phone number from an advertisement, etc. There are many ways for people to get phone numbers. However, locating an account of a person and connecting with this person using the account information of that person may not be as easy as getting a phone number. It would be desirable to find alternative solutions for discovering a person's phone number.

One issue that arises from allowing phone number mapping is a possible scenario where an unscrupulous user could try to use this functionality to create a mass mapping between phone numbers and users. For example, a user may try to obtain as many phone numbers as he or she can, and try to guess the owners of these numbers so that he or she can benefit from connecting with these owners (e.g., by advertising).

SUMMARY

The present disclosure relates to systems and methods for rate-limiting phone number lookups. According to one innovative aspect of the subject matter described in this disclosure, a system having one or more processors and a memory storing instructions that, when executed, cause the system to: receive an address book of a first user, the address book including a phone number that belongs to a second user; create a phone edge by associating the phone number in the address book with an account of the second user; receive a request including the phone number from the first user for obtaining the account associated with the phone number; determine an edge cost associated with the phone edge for the first user; determine whether to provide the phone edge to the first user based on the edge cost; and provide the phone edge to the first user responsive to a positive determination. In some embodiments, the users may be in a social network.

In general, another innovative aspect of the subject matter described in this disclosure may be embodied in methods that include receiving, using one or more processors, an address book of a first user, the address book including a phone number that belongs to a second user; creating, using one or more processors, a phone edge by associating the phone number in the address book with an account of the second user; receiving, using one or more processors, a request including the phone number from the first user for obtaining the account associated with the phone number; determining, using one or more processors, an edge cost associated with the phone edge for the first user; determining, using one or more processors, whether to provide the phone edge to the first user based on the edge cost; and providing the phone edge to the first user responsive to a positive determination.

Other implementations of one or more of these aspects include corresponding systems, apparatus, and computer programs, configured to perform the actions of the methods, encoded on computer storage devices.

These and other implementations may each optionally include one or more of the following features. For instance, the features may include determining whether there is a name corresponding to the phone number in the address book, determining a level of match between the name in the address book and an account name of the second user, and computing the edge cost associated with the phone edge for the first user based on whether the name corresponding to the phone number is in the address book and the level of match between the name in the address book and the account name of the second user. The features may include determining a plurality of edge costs associated with a plurality of phone edges that are created for a plurality of phone numbers in the address book of the first user, computing a cost-based quota for the first user based on the plurality of edge costs, and wherein determining whether to provide the phone edge to the first user is also based on the quota. The features may include adjusting the cost-based quota for the first user. The features may include collecting at least one attribute for an account of the first user, determining an attribute-based quota for the first user based on the at least one attribute, and wherein determining whether to provide the phone edge to the first user is based on the attribute-based quota. The features may include adjusting the attribute-based quota for the first user. The features may include annotating the phone edge with a mark, determining whether to change the mark of the phone edge based on the cost-based quota, and wherein providing the phone edge to the first user is responsive to the mark being changed. The features may include computing a time difference between the request and a failure to provide the phone edge to the first user prior to the request, determining whether the time difference exceeds a threshold time, and wherein determining whether to provide the phone edge to the first user is responsive to the time interval exceeding the threshold time. The features may include notifying the first user of whether the phone edge being provided to the first user.

These implementations are particularly advantageous in a number of respects. For instance, rating look-up requests based on costs and cost-based quota can differentiate look-up requests. Therefore abusive requests can be penalized while the legitimate requests work normally. Moreover, rating look-up requests can be user-dependent. So a first user with a healthier account (e.g., a better reputation) than a second user may have a better chance than the second user to get contact account information. Further, the same solution provided for the phone lookups described in this specification can also be used in other fields such as emails.

It should be understood, however, that the above features and advantages are not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Systems, methods and interfaces for rate-limiting phone number lookups are disclosed. While the systems, methods and interfaces of the present disclosure are now described in the context of client-server systems, it should be understood that the systems, methods and interfaces can be applied to systems other than a client-server system operably connected over a network where painterly rendering is performed on a single server. For example, client devices, a third party server, an email server, or a server where an account look-up application is stored may provide some or all of the functionality described herein and may employ a cluster of servers in order to provide such functionality. As additional examples, client hardware may be a mobile phone or tablet device.

In general, the systems, methods and interfaces for rate-limiting phone number lookups are based on criteria including a cost, a cost-based quota and an attribute-based quota. When a user looks up information of a contact account by sending a request including a phone number of a contact, a cost is determined. The contact account information can be a phone edge that maps the phone number to the contact account. The cost indicates how much the user may pay to get the requested contact account information. A name matching algorithm can be used to determine the cost. If a name corresponding to the phone number in the address book of the use matches the actual contact account name, a minimum cost will be determined. When the name in the address book does not exist or does not match the actual contact account name, a maximum cost will be determined. If there is a partial match between two names, a cost between the minimum and the maximum will be determined. The user gets the requested contact account information (e.g., phone edges) at different costs.

A cost-based quota and an attribute-based quota are also used to determine whether to provide the contact account information to the user. The cost-based quota can be computed based on the number of edges associated with name matches, the number of edges associated with partial name matches, or the number of edges having no name matches and corresponding costs. If the cost-based quota for the user is exceeded, the user cannot get a phone edge. An attribute-based quota may be computed based on attributes of an account associated with the user. The attributes include a creation time of the account, a reputation score the user, etc. The user can get contact account information when the attribute-based quota criterion is met.

By using the cost, the cost-based quota and the attribute-based quota to rate-limit a lookup request, the systems and methods described herein differentiate requests and provide an appropriate response to each request such that the legitimate requests and users get as much benefit as possible and at the same time the abusive requests and users get penalized heavily.

Figure 1:
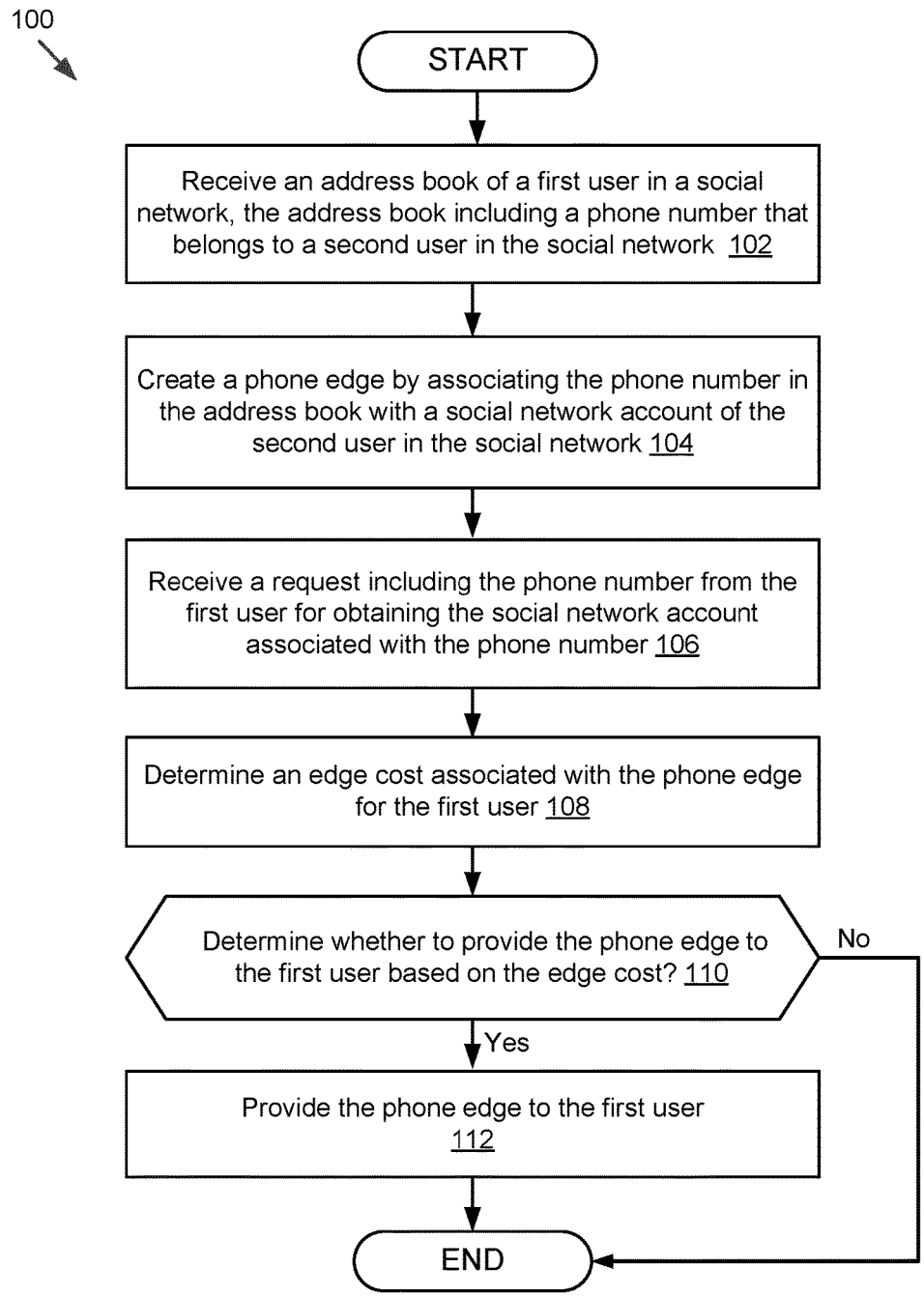
FIG. 1 is a flowchart of an example method for rating a request for obtaining an account via a phone number and determining whether to provide a phone edge including information of the account to a user based on the rating.

FIG. 1 includes a flowchart 100 of an example method for using an account look-up application 720 to rate a request for obtaining an account via a phone number and determine whether to provide a phone edge including information of the account to a user based on the rating. In some implementations, the account may be a social network account. The method 100 begins by receiving 102 an address book of a first user, the address book including a phone number that belongs to a second user. In some implementations, the users may be in a social network. In one example, the attribute engine 802 discussed in further detail with reference to FIG. 8 below may receive the address book. For example, the attribute engine 822 may receive an address book by extracting phone numbers and corresponding names (if any exist) from a contact list managed by a social network application 722 described below. Or the attribute engine 822 can receive phone numbers and names inputted by the first user on a mobile phone and stores them as an address book.

The method 100 then creates 104 a phone edge by associating the phone number in the address book with an account of the second user. In some implementations, the account may be a social network account of the second user in a social network. Throughout this description, the examples and description may indicate accounts and users in a social network, but in some embodiments, the accounts and the users may not be limited to social media accounts associated with social network users.

In one example, the edge creation engine 824 described with reference to FIG. 8 creates the phone edge. For example, the edge creation engine 824 may search user profiles based on a phone number in the address book of a first user, and determines that the phone number (e.g., a home number, a cell number) listed in the user profile of a second user matches the phone number in the address book. As a result, the edge creation engine 824 identifies the second user as the owner of the phone number, and associates the account of the second user with the phone number to create a phone edge. In some instances, when creating a phone edge, the edge creation engine 824 also annotates the phone edge with a mark.

Next, the method 100 may receive 106 a request including the phone number from the first user for obtaining the account associated with the phone number, determine 108 an edge cost associated with the phone edge for the first user, determine 110 whether to provide the phone edge to the first user based on the edge cost, and provide 112 the phone edge to the first user responsive to a positive determination. In one example, the abuse determination engine 828 discussed in further detail with reference to FIG. 8 below may implement these steps.

When the edge creation engine 824 receives a phone number from the first user and creates a phone edge that maps the phone number to an account in the back-end system, this phone edge is unrevealed to the first user. However, the first user may want to know the contact account information included in the phone edge. For example, Alice knows only Jane's phone number but wants to connect with Jane so that Alice can share her wedding photos with Jane. The abuse determination engine 828 receives a request from the first user to look up the contact account associated with the phone number and determines whether to provide the phone edge to the first user responsive to the request. Continuing with the above example, Alice sends a request including Jane's phone number to get Jane's account. Responsive to the request, Alice may receive Jane's account and connect with Jane.

In some instances, the abuse determination engine 828 determines 108 an edge cost associated with the phone edge for the first user and determines 110 whether to provide the phone edge to the first user based on the edge cost. For example, the abuse determination engine 828 may determine a zero cost for Alice so that Alice can obtain Jane's account without any cost. However, if the abuse determination engine 828 determined a 1000 cost for Alice, Alice needs to pay 1000 to get Jane's account. This rate-limit mechanism can protect the benefit of a legitimate user (e.g., with a zero cost) while at the same time mitigating the risk of abusive behavior (e.g., with a 1000 cost).

Figure 2A:
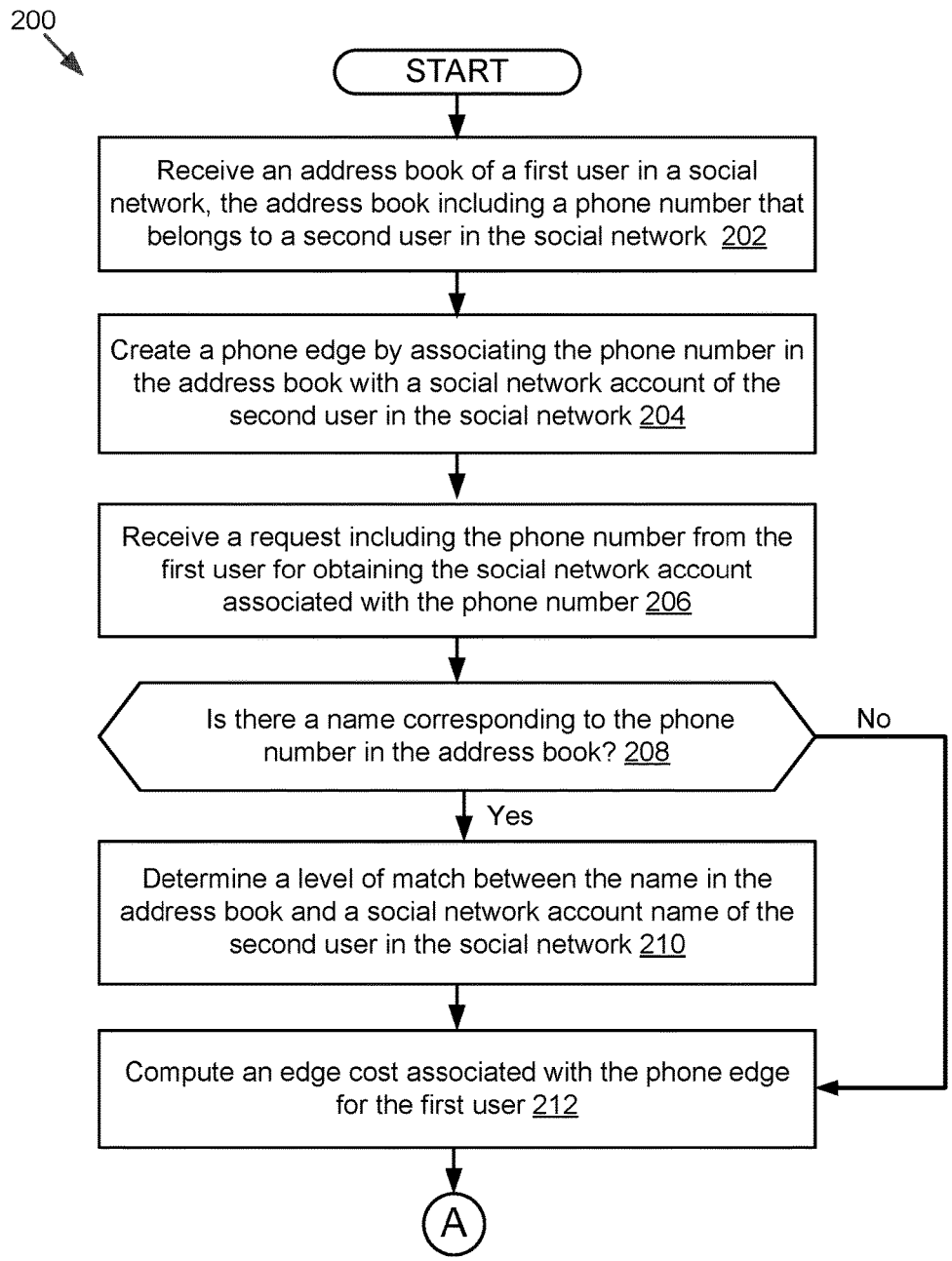
FIGS. 2A and 2B are a flowchart of a specific example method for rating a request for obtaining an account via a phone number and determining whether to provide a phone edge including information of the account to a user based on the rating.
Figure 2B:
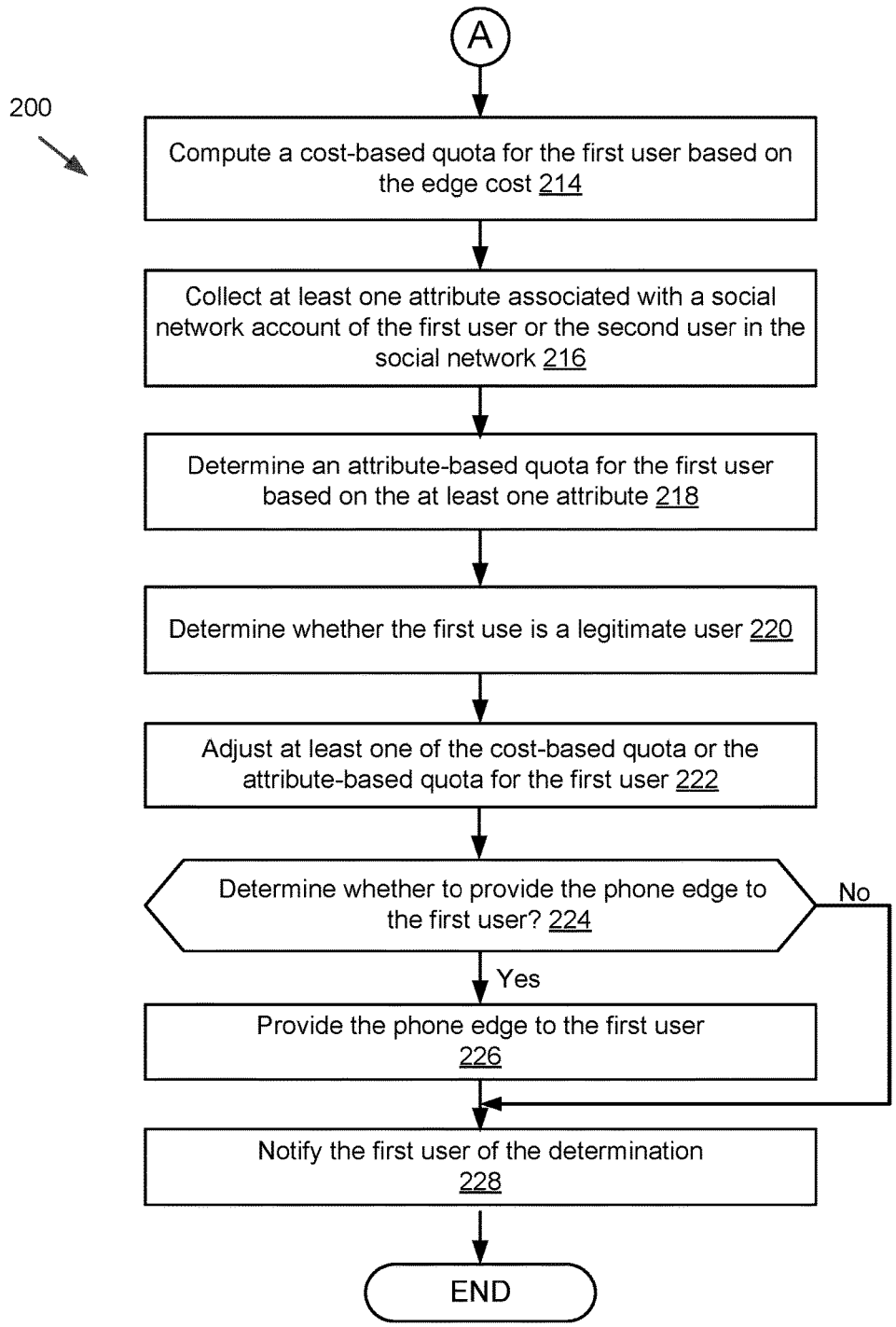

FIGS. 2A and 2B are a flowchart of a specific example method for rating a request for obtaining an account via a phone number and determining whether to provide a phone edge including information of the account to a user based on the rating. In FIG. 2A, the method 200 receives 202 an address book of a first user, the address book including a phone number that belongs to a second user. The method 200 then creates 204 a phone edge by associating the phone number in the address book with an account of the second user. The method 200 next receives 206 a request including the phone number from the first user for obtaining the account associated with the phone number and determines how to respond this request.

To respond the request, the abuse determination engine 828 first determines 208 whether there is a name corresponding to the phone number in the address book. If yes, the abuse determination engine 828 determines 210 a level of match between the name in the address book and an account name of the second user and computes 212 an edge cost associated with the phone edge for the first user. If not, the abuse determination engine 828 directly computes 212 an edge cost associated with the phone edge for the first user. For example, if the name in the address book is "John Smith," which fully matches the account name "John Smith," the abuse determination engine computes a name-matching-edge-cost with a cost value ten. If the name in the address book is "John," which partially matches the account name "John Smith," the abuse determination engine computes a partial-name-matching-edge-cost with a cost value 300. If no name exists in the address book that corresponds to the phone number of "John Smith," the abuse determination engine computes a non-name-matching-edge-cost with a cost value 2000.

Now refer to FIG. 2B, the abuse determination engine 828 computes 214 a cost-based quota for the first user based on the edge cost. For example, if the first user is allowed a maximum 100 name-matching-edges, 50 partial-matching-edges and 20 non-name-matching-edges per day, and the corresponding name-matching-edge-cost, the partial name-matching-edge-cost 10 and the non-name-matching-edge-cost are 10, 500 and 1000, respectively, the abuse determination engine 828 computes a 46k/day cost-based quota, i.e., the cost-based quota=100×10+50×500+20×1000=46000.

The abuse determination engine 828 also collects 216 at least one attribute associated with an account of the first user or the second user. For example, the at least one attribute includes a creation time of the owner account associated with the first user, a reputation score of the first user, etc. The abuse determination engine 828 determines an attribute-based quota for the first user based on the at least one attribute. For example, the abuse determination engine 828 gives Alice an attribute-based quota that is higher than the attribute-based quota assigned to Andrew because the reputation score of Alice is higher than the reputation score of Andrew.

The abuse determination engine 828 determines 220 whether the first user is a legitimate user and adjusts 222 at least one of the cost-based quota and the attribute-quota for the first user. For example, if none of the names in the address book of the first user matches the actual social network account names, the abuse determination engine 828 can determine that the first user is an abuser and decrease the cost-quota for the first user from 300k/month to 10k/month to penalize the abusive behaviors. The abuse determination engine 828 then determines 224 whether to provide the phone edge to the first user based on at least one of the edge cost, the cost-based quota and the attribute-based quota. Responsive to a positive determination, the abuse determination engine 828 provides 226 the phone edge to the first user. The abuse determination engine 828 may notify 228 the first user of the determination.

Figure 3:
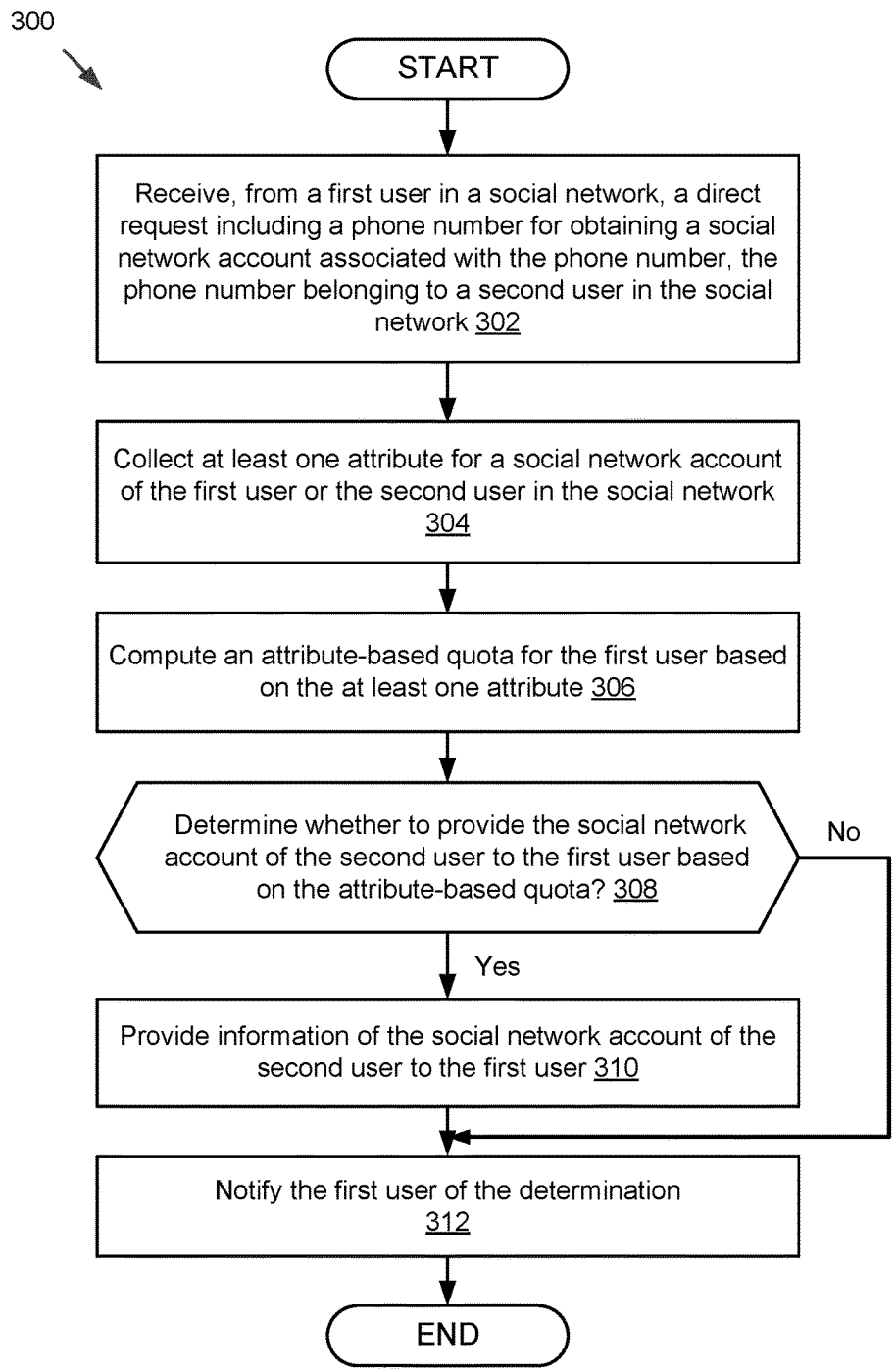
FIG. 3 is a flowchart of an example method for rating a request for obtaining an account via a phone number and determining whether to provide information of the account to a user based on the rating.

FIG. 3 includes a flowchart of an example method for rating a request for obtaining an account via a phone number and determining whether to provide information of the account to a user based on the rating. The method 300 begins by receiving, from a first user, a direct request including a phone number from a first user for obtaining an account associated with the phone number, the phone number belonging to a second user. For example, the first user sends a direct request by entering a phone number in a search box (e.g., of a user profile homepage managed by a social network application 722 described below) to look up the account corresponding to the phone number. In some implementations, the method 300 then collects 304 at least one attribute for an account of the first user, and computes 306 an attribute-based quota for the first user based on the at least one attribute. In some embodiments, method 300 also collects 304 at least one attribute for an account of the second user. The method 300 next determine 308 whether to provide the social network account of the second user to the first user based on the attribute-based quota. Responsive to a positive determination, the method 300 provides 310 information of the account to the first user. The method 300 also notifies 312 the first user of the determination.

Figure 4:
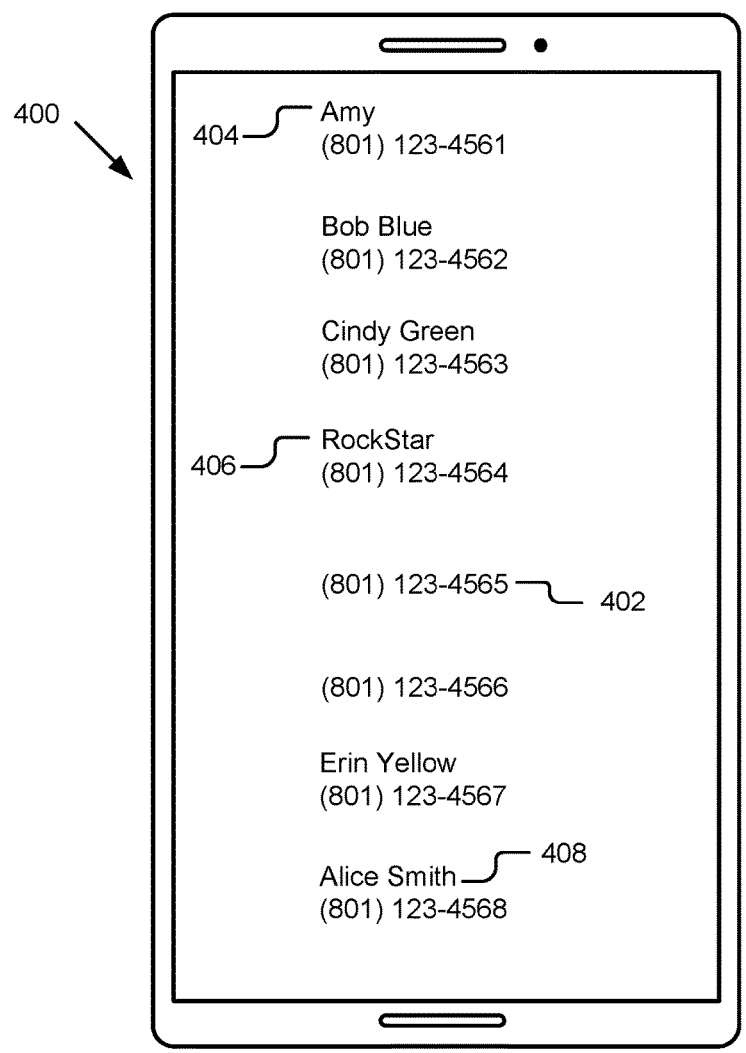
FIG. 4 is a graphical representation of an example address book.

FIG. 4 is a graphic representation of an example address book. In the illustrated example, the address book 400 is stored on a mobile phone of a user. The address book includes at least phone numbers of the user's contacts. An entry of the address book (e.g., 402) may include only a phone number. An entry may also include a phone number and a name corresponding to the phone number. For example, 404 includes a first name "Amy" that corresponds to the number 801-123-4561. 406 includes a nickname "Rockstar" that corresponds to the number 801-123-4564. An entry (e.g., 408) may further include a phone number and a full name corresponding to the phone number. The user wants to use the phone numbers in the address book to find social network accounts corresponding to each contact such that the user can connect to these contacts. The user can then share photos, provide recommendations and interact with the contacts in other ways. To help the user connect with the contacts, this address book is sent to engines 822-828 described below with reference to FIG. 8 to determine whether to provide the information of contact accounts to the user.

Figure 5:
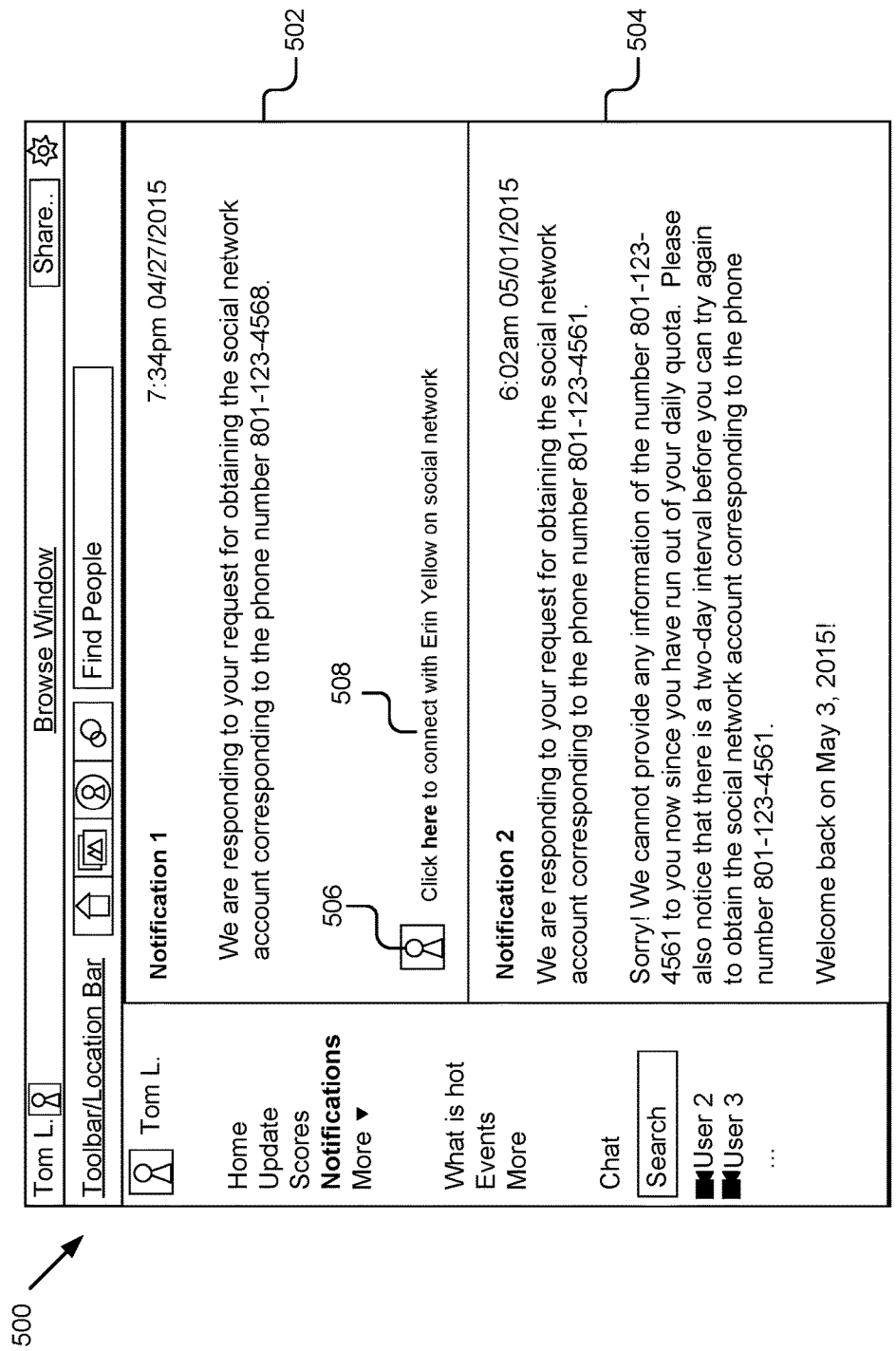
FIG. 5 is a graphical representation of example notifications for a user.

FIG. 5 is a graphic representation of example notifications for a user. In the illustrated FIG. 5, a user profile page 500 is displayed to a user Tom L. The user profile page 500 includes a first notification 502 and a second notification 504. In some instances, the notification engine 830 communicates with the abuse determination engine 828 to send the notification 502 or 504 based on a determination as to whether to provide information of a contact account to a user responsive to a request from the user. The first notification 502 responds to a user request for obtaining the account corresponding to the phone number 801-123-4568. The first notification 502 tells the user that the requested social network account is associated with the user "Erin Yellow" and the requested social network account information of "Erin Yellow" has been provided to the user by providing the user a photo 506 of "Erin Yellow" and a link 508 that allows the user to connect with "Erin Yellow." The second notification 504 responds to a user request for obtaining the account corresponding to the phone number 801-123-4561. The second notification 504 notifies the user that the requested information cannot be provided. In addition, the second notification 504 also includes an explanation regarding why the user cannot get the requested information (e.g., a failure to meet the quota criterion) and a reminder that the user should retry the same request after two days to limit the number of retry requests.

Figure 6:
FIG. 6 is a graphical representation of an example notification for an abuser.

FIG. 6 is a graphic representation of an example notification for an abuser. In the illustrated FIG. 6, a user profile page 600 is displayed to a user Tom L. The user profile page 600 includes a notification 602. The notification 602 responds to a user request for obtaining the account corresponding to the phone number 801-123-4567. The notification 602 notifies the user that the requested information cannot be provided to the user since the current request is classified as an abusive request and the user is classified as an abuser. The notification 602 further gives an explanation about the classification, e.g., the user tried many times to get social network accounts using the phone number and most of them failed. For example, the user may have a giant list of phone numbers that were randomly generated in the format of a real phone number (e.g., 10 digits, starting with a non-zero number, etc.). The user uses this list to guess which social network accounts can be matched to these phone numbers so that the user can benefit from connecting with these social network accounts (e.g., by advertising to these social network accounts). Such abusive behaviors can be detected as indicated by the notification 602. The notification 602 additionally notifies the user that the quota for the user is decreased, which is also an preventive action for future abusive behaviors.

Figure 7:
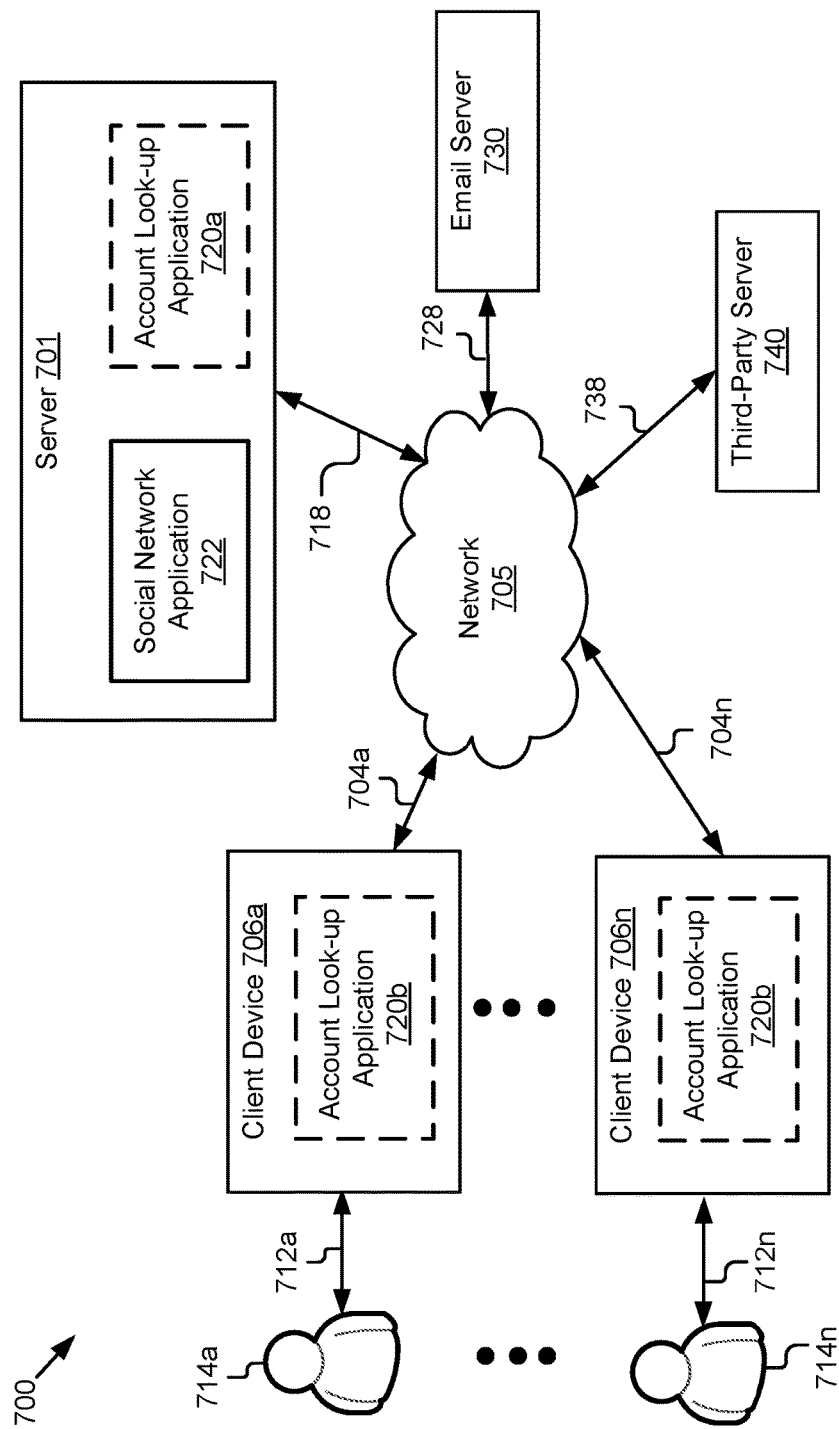
FIG. 7 is a block diagram illustrating an example system for rating a request for obtaining an account via a phone number and determining whether to provide information of the account to a user based on the rating.

FIG. 7 illustrates a block diagram of a system 700 for rating a request for obtaining an account via a phone number and determining whether to provide information of the account to a user based on the rating. The illustrated system 700 includes client devices 706a, 706n that are accessed by users 714a, 714n, a server 701, an email server 730 and a third-party server 740. In the illustrated example, these entities are communicatively coupled via a network 705. In FIG. 1 and the remaining figures, a letter after a reference number, for example, "706a" is a reference to the element having that particular reference number. A reference number in the text without a following letter, for example, "706" is a general reference to different embodiments of the element bearing that reference number. Although only two devices are illustrated, persons of ordinary skill in the art will recognize that arbitrary number of client devices 706n is available to arbitrary number of users 714n.

The network 705 can be a conventional type, wired or wireless, and may have numerous different configurations including a star configuration, token ring configuration or other configurations. Furthermore, the network 705 may include a local area network (LAN), a wide area network (WAN) (e.g., the Internet), and/or other interconnected data paths across which multiple devices may communicate. In some instances, the network 705 may be a peer-to-peer network. The network 705 may also be coupled to or includes portions of a telecommunications network for sending data in a variety of different communication protocols. In some other instances, the network 705 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 705 coupled to the client device 706 and the third-party server 740, in practice one or more networks 705 can be connected to these entities.

The client devices 706a, 706n in FIG. 1 are used by way of example. Although only two client devices 706 are illustrated, the disclosure applies to a system architecture having any number of client devices 706. In the illustrated implementation, the users 714a, 714n interact with the client device 706a, 706n via signal line 712a, 712n respectively. The client devices 706a, 706n are communicatively coupled to the network 705 via signal line 704a, 704n respectively, and exchange information with the server 701, the email sever 730 and the third-party server 740. For example, the client device 706a sends a request to the server 701 to look up an account via a phone number. The account is associated with a user. The server 701 processes the request and determines whether to provide the requested account information to the client device 706a.

In some instances, the client device 706 can be any computing device that includes a memory and a processor. For example, the client device 706 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 705, etc.

The server 701 can be a hardware server that includes a processor, a memory and network communication capabilities. The server 701 is communicatively coupled to the network 705 via signal line 718. In some instances, the server 701 sends and receives data to and from one or more of the client device 706, the email server 730 and the third-party server 740 via the network 705. The server 701 includes a social network application 722.

A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. The social network application 722 in the server 701 manages the social network by handling registration of users, publication of content (e.g. posts, comments, photos, links, check-ins, etc.), hosting multi-user communication sessions, managing of groups, managing different sharing levels, updating the social graph, etc. The social network application 722 registers a user by receiving information such as a username and password and generates a user profile that is associated with the user and stored as part of the social graph. In some instances, the user profile includes additional information about the user including interests (e.g. soccer, reading, food, subscriptions, etc.), activities (e.g. search history, indications of approval, posts, comments, multi-user communication sessions, etc.), demographics (e.g. age, ethnicity, location, etc.) and profile rating and reputation (e.g., intelligence rating, humor rating, etc.). The system 700 may include multiple servers 701 that include traditional social network servers, email servers, micro-blog servers, blog servers, forum servers, message servers, etc.

Furthermore, the server 701 and the social network application 722 may be representative of one social network. There may be multiple social networks coupled to the network 705, each having its own server, application and social graph. For example, a first social network may be more directed to business networking, a second may be more directed to or centered on academics, and a third may be more directed to local business.

The email server 730 can be a hardware server that includes a processor, a memory and network communication capabilities. The email server 730 is communicatively coupled to the network 705 via signal line 728. In some instances, the email server 730 comprises a search engine 730. The search engine 730 receives a search request from the client device 706, conducts a search based on the search request and sends a search result back to the client device 706. For example, the search request includes keywords such as "phone," "cell," or "contact," etc. The search result includes phone numbers and maybe contact names associated with the phone numbers. The server 701 communicates with the client device 706 to determine an address book based on the search result and process the address book to determine whether to provide an account corresponding to a phone number to a user.

The third-party server 740 can be a computing device that includes a processor, a memory and network communication capabilities. The third-party server 740 is coupled to the network 705 via signal line 738. The third-party server 740 sends and receives data to and from the client device 706, the server 701 and the search server of the system 700 via the network 705. For example, the third-party server 740 stores a third-party application (e.g., a phone number generator) and sends phone numbers received from the third-party application to the server 701 for further processing.

In some instances, the server 701 comprises an account look-up application 720a. In other instances, the account look-up application 720b may also be stored on the client device 706. For example, the account look-up application 720b is a thin-client application that includes part of the account look-up application 720 on the client device 706 and part of the account look-up application 720 on the server 701 to determine whether to provide the user information of an account requested by the user.

The account look-up application 720 receives a request from a first user to look up an account and determines whether to provide the account to the first user. The request includes a phone number. The first user wants to find out to which social network account this phone number belongs so that the first user can connect with a second user that is associated with the account. In some scenarios, the phone number may be the only thing that the first user knows about the account. The first user just wants to get as much as social network accounts that map to the phone numbers so that he or she can benefit from connecting with these social network accounts. Such behavior is a potential abusive behavior. The account look-up application 720 works in a way to mitigate the risk of abusive behaviors and to protect the legitimate behaviors at the same time.

In some instances, responsive to receiving a phone number from a first user, the account look-up application 720 creates a phone edge to map the phone number to the corresponding social network account. The account look-up application 720 creates this phone edge but does not reveal this phone edge to the first user. The account look-up application 720 receives a request from the first user to read this phone edge, and computes a cost, a cost-based quota and an attribute-based quota to determine if the first user can read this phone edge. In some instances, the account look-up application 720 uses a name matching algorithm to determine the cost and the cost-based quota. For example, Ryan has a number 1234567 and wants to connect with whoever this number 1234567 belongs to. The account look-up application 720 determines that this number 1234567 belongs to John Smith, and creates a phone edge to map this 1234567 to John Smith. In a first scenario, Ryan is a friend of John Smith. Ryan puts John's name along with John's phone number in his address book. So when Ryan requests information of John's social network account, the account look-up application 720 determines that the name in Ryan's address book matches the account name of John Smith. Based on this match, the account look-up application 720 assigns a zero cost to the phone edge and allows Ryan to connect with John without any cost. In a second scenario, John is a plumber that worked for Ryan once. Ryan has John's first name and phone number in his address book. Now Ryan needs John's help again but cannot reach John through the phone. Ryan wants to find John using his phone number and connects with John. The account look-up application 720 determines a partial match between the name "John" in Ryan's address book and the social account name "John Smith." Based on this partial match, the account look-up application 720 may assign a cost 50 to the phone edge and allow Ryan to pay 50 to connect with John. In a third scenario, Ryan gets a list of numbers randomly generated by a phone number generator. Ryan does not know who owns the number 1234567 and therefore has no name associated with this number in Ryan's address book. Ryan wants to know to whom this number points to so that he can send an advertisement to this person. The account look-up application 720 receives Ryan's request and determines that there is no name match at all. In this case, the account look-up application 720 sets a cost 5000 to Ryan so that Ryan can only pay 5000 to get John's information. The account look-up application 720 differentiates the three requests in three different scenarios, and provides the appropriate solution to respond to each request.

In other instances, the account look-up application 720 also computes an attribute-based quota to determine whether to provide contact account information to a requesting user. For example, the account look-up application 720 increases the attribute-based quota for a user because the user's reputation score increases as the user gets more followers.

The higher attribute-based quota may lead the user get contact account information associated with a higher number of phone numbers.

In some instances, the account look-up application 720 classifies a request as legitimate or abusive. For the above example, the account look-up application 720 may determine the request in the first scenario to be legitimate and determine the request in the third scenario to be an abusive request. Accordingly, the account look-up application 720 responds the legitimate request with no cost while in the meantime penalizing the abusive request by raising the cost to 5000.

The same solution provided by the account look-up application 720 can also be applied to emails. When using email lookups, the account look-up application 720 may mitigate the "find the owners of all email addresses up to six or seven characters long" since the email space is much larger.

Figure 8:
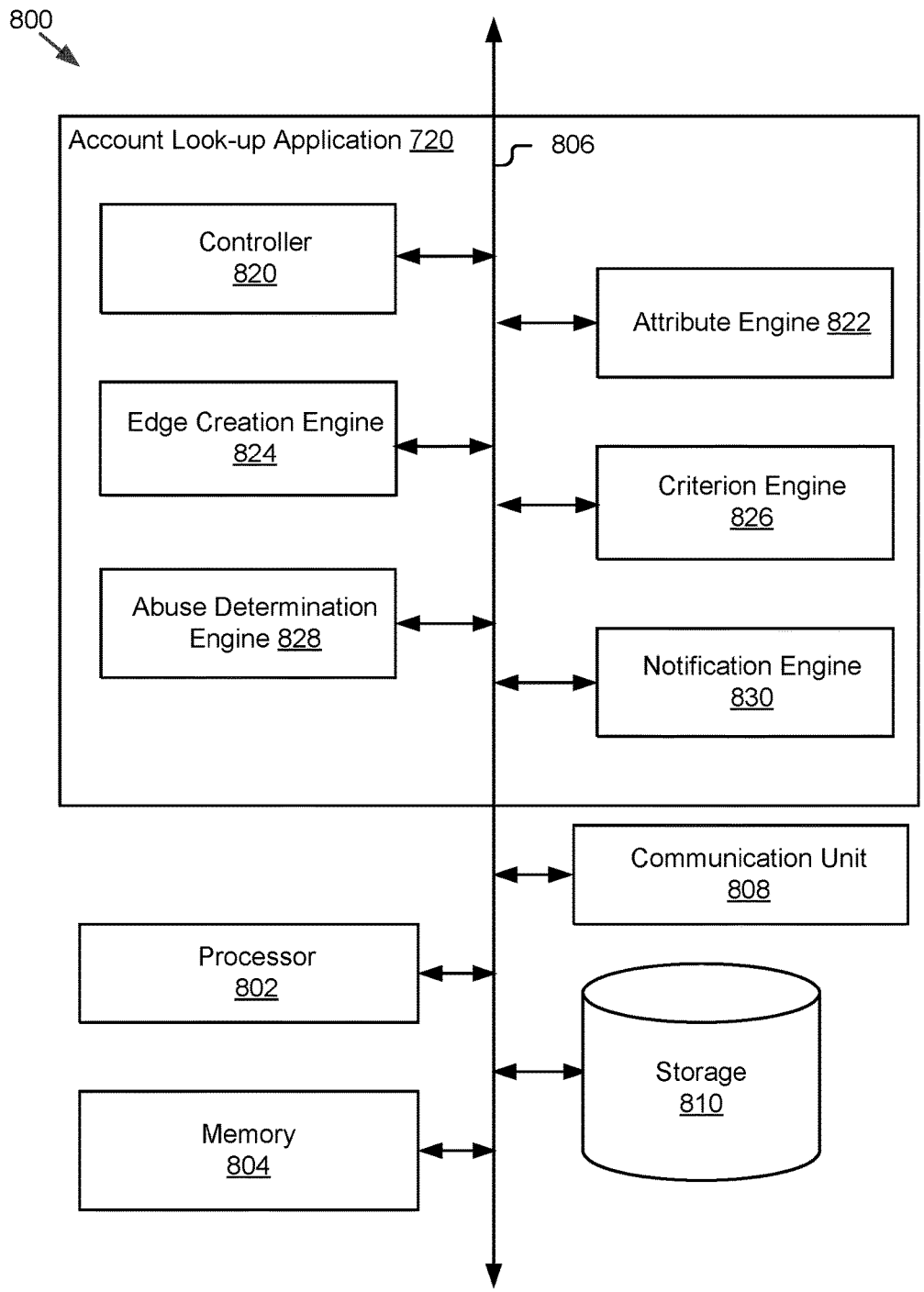
FIG. 8 is a block diagram illustrating one instance of an account look-up application.

Referring now to FIG. 8, an example of the account look-up application 720 is shown in more detail. FIG. 8 is a block diagram of a computing device 800 that includes a processor 802, memory 804, a communication unit 808, a storage 810 and an account look-up application 720 according to some implementations. The components of the computing device 800 are communicatively coupled by a bus 806. In some instances, the computing device 800 is the server 701. In other instances, the computing device 800 is the client device 706.

The processor 802 includes some or all of an arithmetic logic unit, a microprocessor, a general purpose controller or some other processor array to perform computations and provide electronic display signals to a display device. The processor 802 is coupled to the bus 806 for communication with the other components. Processor 802 processes data signals and may include various computing architectures including a complex instruction set computer (CISC) architecture, a reduced instruction set computer (RISC) architecture, or an architecture implementing a combination of instruction sets. Although FIG. 8 includes a single processor, multiple processors are included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 804 stores instructions and/or data that may be executed by processor 802. The memory 804 is coupled to the bus 806 for communication with the other components. The instructions and/or data may include code for performing any and/or all of the techniques described herein. The memory 804 may be a dynamic random access memory (DRAM) device, a static random access memory (SRAM) device, flash memory or some other memory device known in the art. In some instances, the memory 804 also includes a non-volatile memory or similar permanent storage and media, for example, a hard disk drive, a floppy disk drive, a CD-ROM device, a DVD-ROM device, a DVD-RAM device, a DVD-RW device, a flash memory device, or some other mass storage known in the art for storing information on a more permanent basis.

The communication unit 808 transmits and receives data to and from at least one of the client device 706, the server 701, the email server 730 and the third-party server 740. The communication unit 808 is coupled to the bus 806. For example, the communication unit 808 receives data including an address from the client device 706 and transmits the data to the server 701. The server 710 processes the data using an account look-up application 720 stored on the server 701 and transmits a result to the client device 706.

In some instances, the communication unit 808 includes a port for direct physical connection to the client device 706 or to another communication channel. For example, the communication unit 808 includes an RJ45 port or similar port for wired communication with the client device 706. In other instances, the communication unit 808 includes a wireless transceiver (not shown) for exchanging data with the client device 706 or any other communication channel using one or more wireless communication methods, such as IEEE 802.11, IEEE 802.16, Bluetooth® or another suitable wireless communication method.

In some other instances, the communication unit 808 includes a cellular communications transceiver for sending and receiving data over a cellular communications network such as via short messaging service (SMS), multimedia messaging service (MMS), hypertext transfer protocol (HTTP), direct data connection, wireless application protocol (WAP), e-mail or another suitable type of electronic communication. In still another embodiment, the communication unit 808 includes a wired port and a wireless transceiver. The communication unit 808 also provides other conventional connections to the network 705 for distribution of files and/or media objects using standard network protocols such as TCP/IP, HTTP, HTTPS and SMTP as will be understood to those skilled in the art.

The storage 810 is a non-transitory memory that stores data for providing the functionality described herein. The storage 810 is coupled to the bus 806. The storage 810 may be a dynamic random access memory (DRAM) device, a static random access memory (SRAM) device, flash memory or some other memory devices. In some instances, the storage 810 also includes a non-volatile memory or similar permanent storage and media including a hard disk drive, a floppy disk drive, a CD-ROM device, a DVD-ROM device, a DVD-RAM device, a DVD-RW device, a flash memory device, or some other mass storage for storing information on a more permanent basis.

In some instances, the storage 810 stores social network profiles associated with users, account attributes collected for the users (e.g., a creation time of an account, a reputation score of a user, etc.), address books of the users, phone edges that map phone numbers to social network accounts, notifications, etc.

In some instances, the account look-up application 720 comprises a controller 820, an attribute engine 822, an edge creation engine 824, a criterion engine 826, an abuse determination engine 828, and a notification engine 830.

The controller 820 can be software including routines for receiving data and transmitting the data to an appropriate component. In some instances, the controller 820 can be a set of instructions executable by the processor 802 to provide the functionality described below for receiving and transmitting the data. In other instances, the controller 820 can be stored in the memory 804 of the computing device 800 and can be accessible and executable by the processor 802. In some instances, the controller 820 can be adapted for cooperation and communication with the processor 802 and other components of the computing device 800.

In some instances, the controller 820 receives data via the communication unit 808 and transmits the data to the appropriate engine of the account look-up application 720. For example, the controller 820 receives an address book from the client device 106 via the communication unit 808 and transmits the address book to the attribute engine 822 for further processing. In another example, the controller 820 receives information of an account from the edge creation engine 824 and at least one attribute from the attribute engine 822, and transmits the information of the account and the at least one attribute to the abuse determination engine 826 to determine whether to provide the information of the account to a requesting user based on the at least one attribute.

The attribute engine 822 can be software including routines for collecting attribute information associated with an account. In some instances, the attribute engine 822 can be a set of instructions executable by the processor 802 to provide the functionality described below for collecting attribute information associated with an account. In other instances, the attribute engine 822 can be stored in the memory 804 of the computing device 800 and can be accessible and executable by the processor 802. In some instances, the attribute engine 822 can be adapted for cooperation and communication with the processor 802 and other components of the computing device 800.

The attribute engine 822 communicates with the social network application 722 to collect attribute information of an account. The account can be an owner account associated with a first user. The first user requests for looking up another social network account using a phone number. The other social network requested by the first user is a contact account. The contact account is associated with a second user. The attributes collected by the attribute engine 822 can be used to determine whether a request from the first user for requesting the contact account associated with the second user is legitimate and to determine whether to provide the contact account information to the first user. The contact account information includes at least an account name of the second user and a user profile of the second user.

In some instances, the attribute engine 822 collects the attributes for the owner account including a name of the owner account, a creation time of the owner account, an age of the owner account, account health attributes, etc. In some instances, the account health attributes include a reputation score, a user classification (e.g., an abuser, a spammer, a helper, etc.) or other signals received from an abuse detection system that is installed on other servers (e.g., a mobile phone, an email server, etc.). For example, an indication that the first user has a good reputation may favor in determining that a look-up request from the first user is legitimate. In other instances, the account health attributes include activity data as to whether profile configuration of the owner account has been completed, when was the last time the user profile of the owner account got updated, how long on average the user profile of the owner account got updated, etc. For example, the account health attribute showing zero update in the owner account except for requesting a contact account via a phone number in the past two month is an indication against the request being legitimate.

In other instances, the attribute engine 822 collects the attributes for the contact account including a name of the contact account, a creation time of the contact account, an age of the contact account, and attributes based on activity data including whether the second user associated with the contact account also acts as an owner to request for a third social network account (i.e., a different contact account), how often the second user initiates a request for the different contact account, etc.

In some other instances, the attribute engine 822 collects the attributes regarding what update the owner account is doing on the information related to the contact account. For example, the attribute engine 822 determines what and how a first user updates an entry in an address book of the first user. The entry includes information of a contact such as a phone name and a name. The attribute engine 822 may collect attributes showing that an entry was first created without a contact name "John Smith" corresponding to a phone number, then the first name "John" was added to correspond to the phone number, and finally the last name "Smith" was added to correspond to the phone number. These attributes help in determining whether to provide the contact account information of the second user to the requesting first user. For example, the frequent updates of names in multiple entries of the first user's address book could be a hint of an abusive behavior.

The attributes may include an address book of a first user. The address book includes information of contacts of the first user. An entry in the address book includes a phone number. An entry may also include a full name, a partial name or no name of a contact to which the phone number belongs. An example address book is depicted below with reference to FIG. 4. In some instances, the attribute engine 822 receives the address book for a first user from the social network application 722. For example, the attribute engine 822 obtains an address book by extracting phone numbers and corresponding names (if any exist) from a contact list managed by the social network application 722. In other instances, the attribute engine 822 receives the address book for a first user from the client device 106. For example, the attribute engine 822 obtains the address book stored on the mobile phone of the first user. In some implementations, the attribute engine 822 receives phone numbers and names inputted by the first user on the mobile phone and stores them in the address book. The user inputted phone number can be randomly generated number that takes the format of a real phone number and is used simply for lookup purposes. In some other instances, the attribute engine 802 communicates with the email server 730 or in some implementations, the third-party server 740, to collect the addresses book for the first user. For example, the attribute engine 802 obtains the address book for the first user based on analyzing email signatures. Or the attribute engine 802 collects the address book for the first user by pulling in and combining contacts from other social network servers. The attribute engine 802 combines the address books from a variety of sources into an address book for the first user.

The attribute engine 822 collects attributes related to a user under user consent. In some instances, the attribute engine 822 stores the collected attributes in the storage 810. In other instances, the attribute engine 822 transmits the collected attributes to the edge creation engine 824, the criterion engine 826 and the abuse determination engine 828 for further processing.

The edge creation engine 824 can be software including routines for creating a phone edge responsive to receiving a phone number from the attribute engine 822. In some instances, the edge creation engine 824 can be a set of instructions executable by the processor 802 to provide the functionality described below for creating a phone edge responsive to receiving a phone number from the attribute engine 822. In other instances, the edge creation engine 824 can be stored in the memory 804 of the computing device 800 and can be accessible and executable by the processor 802. In some instances, the edge creation engine 824 can be adapted for cooperation and communication with the processor 802 and other components of the computing device 800.

In some instances, the edge creation engine 824 receives an address book of a first user from the attribute engine 822. An entry of the address book includes at least a phone number. An entry of the address book may also include a full name, a nickname or a partial name corresponding to the phone number. The edge creation engine 824 creates a phone edge by mapping the phone number to an account. The phone edge is the connection between a phone number and an account. For example, the edge creation engine 824 searches user profiles based on a phone number in the address book of a first user, and determines that the phone number (e.g., a home number, a cell number) listed in the user profile of a second user matches the phone number in the address book. As a result, the edge creation engine 824 identifies the second user as the owner of the phone number, and associates the account of the second user with the phone number to create a phone edge. In some instances, when creating a phone edge, the edge creation engine 824 also annotates the phone edge with a mark. The mark can be modified and used by the abuse determination engine 828 described below to determine whether the first user can read this phone edge.

In some instances, the edge creation engine 824 creates a phone edge in the back-end of the system 800, and therefore the phone edge is unrevealed to the first user. The phone edge includes information of the contact account that is mapped to a phone number given in the address book of the first user. Such information may be unknown to the first user and is requested by the first user. For example, Alice knows only Jane's phone number but wants to connect with Jane based on the phone number so that Alice can share her wedding photos with Jane. In some instances, in addition to creating a phone edge for a phone number in the address book of a first user, the edge creation engine 824 also generates a request for the first user to look up the contact account associated with the phone number. The phone edge may or may not be revealed to the first user as a response to the request. Continuing with the above example, when the edge creation engine 824 creates a phone edge to connect Jane's phone number listed in Alice's address book with Jane's social network account, the edge creation engine 824 also generates a request for Alice to request Jane's social network account. Responsive to the request, Alice may receive Jane's social network account and connect with Jane. The determination of whether to provide the phone edge to the first user responsive to receiving the request will be described below in detail with reference to the abuse determination engine 828.

In some instances, the edge creation engine 824 receives a list of phone numbers included in the address book of a first user. The edge creation engine 824 creates a phone edge for each phone number in the list by associating each phone number with an account that the phone number points to. In some instances, the edge creation engine 824 receives the address book periodically from the attribute engine 822 and creates phone edges based on the address book. In some instances, the edge creation engine 824 stores phone edges in the storage 810.

The criterion engine 826 can be software including routines for setting up at least one criterion for responding a request for looking up an account via a phone number. In some instances, the criterion engine 826 can be a set of instructions executable by the processor 802 to provide the functionality described below for setting up at least one criterion for responding a request for looking up an account via a phone number. In other instances, the criterion engine 826 can be stored in the memory 804 of the computing device 800 and can be accessible and executable by the processor 802. In some instances, the criterion engine 826 can be adapted for cooperation and communication with the processor 802 and other components of the computing device 800.

For a first user who has a phone number of a second user and wants to connect with the second user, there are two ways to send a request for looking up the account of the second user (i.e., a contact account) using the phone number. In some instances, the first user sends a direct request by entering a phone number in a search box (e.g., of a user profile homepage managed by the social network application 722) to look up the contact account corresponding to the phone number. In other instances, the edge creation engine 826 automatically generates a request for the first user to look up the contact account corresponding to the phone number in the address book of the first user. This automatic request generation mechanism is advantageous because it reduces the time and errors to find the contact account. Both a direct request and an automatic request may be referred to hereafter as a look-up request.

The criterion engine 826 sets up at least one criterion that is used to determine whether to provide the information of the contact account to the first user responsive to receiving a direct request or an automatic request. The at least one criterion can include a cost-based quota and an attribute-based quota.

In some instances, the criterion engine 826 sets a cost for a phone edge and defines how to compute a quota for a requesting user (e.g., the first user) based on the cost. This cost and cost-based quota are edge-related as they can only be used in the scenario where a lookup request is automatically generated by the edge creation engine 824. The phone edge maps a phone number in the address book of the first user to an account of a second user. In some instances, the criterion engine 826 determines a cost for the phone edge based on a level of match between a name corresponding to the phone number in the address book and an account name of the second user. For example, when the two names match, the criterion engine 820 determines a name-matching-edge-cost to be 10 and assigns the name-matching-edge-cost to the phone edge. When the two names partially match, the criterion engine 820 determines a partial-name-matching-edge cost to be 500 and assigns the partial-name-matching-edge cost to the phone edge. When the two names do not match, the criterion engine 820 determines a non-name-matching-edge cost to be 1000 and assigns the non-name-matching-edge cost to the phone edge. Generally, the less name matching, the higher the cost is. In the name-matching scenario, the first user knows both the phone number and the name of the second user. The first user is therefore likely to be the acquaintance of the second user. The request from the first user for the account of the second user is likely to be legitimate. The first user may get the account of the second user with the least cost. In the non-name-matching scenario, the first user knows only the phone number of the second user. It is not necessarily an abusive case that the first user attempts to guess a contact with a random number, but the abusive case is likely to be dominant. The request and the edge could signal the abusive behavior. The first user may not get the account of the second user or get it with the maximum cost. One skilled in the art will know that the criterion engine 826 can determine different types of costs and different cost values.

The criterion engine 826 assigns costs to phone edges created based on a list of phone numbers in the address book of a first user by the edge creation engine 824. The criterion engine 826 then defines how to compute a quota for a requesting user (e.g., the first user) based on the costs. In some instances, the criterion engine 826 defines a quota as a sum of the costs weighted by the number of corresponding edges. For example, a cost-based quota for the first user=the number of name-matching edges×the name-matching cost+ the number of partial-name-matching edges×the partial-name-matching cost+the number of non-name-matching edges×the non-name-matching cost. One skilled in the art will know that other algorithms can be used to compute a quota based on costs. The cost-based quota is used to determine whether to provide a phone edge to the first user. The higher the quota, the higher the possibility that the first user gets the phone edge. The abuse determination engine 828, which will be described below, determines whether to provide a phone edge to a requesting user based on the cost-based quota.

The criterion engine 826 also sets up criteria for determining the level of a name match. The criteria include determining whether there is a full name match, determining whether to ignore letter cases (e.g., whether daViD matches David), determining whether to ignore prefixes and suffixes in names (e.g., whether Mr. David Smith matches David Smith), determining whether to ignore diacritical marks, punctuation, whitespace, etc. (e.g., whether David, Smith matches David Smith), determining whether a first name match or a middle name match or a last name match work (e.g., whether David matches David Smith, whether David S matches David Smith, whether Smith matches David Smith, whether Joe matches David Joe Smith), determining whether a different name order matters (e.g., whether David Smith matches Smith David), determining whether common short names and nicknames work (e.g., whether Bob Smith matches Robert Smith, whether Jen matches Jennifer Smith), determining whether slightly misspelled names work (e.g., whether Jenifer matches Jennifer Smith, whether Radika matches Radhika Smith), and determining whether one name is substring of the other name (e.g., whether Rad matches Radhika, whether hik matches Radhika), etc.

In some instances, the criterion engine 826 sets up criteria for determining a confidence score for a name match and associates the confidence score with the corresponding phone edge. The confidence score may range between zero and one. For example, based on the criteria from the criterion engine 826, a full name match has a confidence score that equals one, the name match between Jenifer and Jennifer Smith (with one letter mismatch) has a higher confidence score than the name match between Rad and Radhika (with four letters mismatch), and the name match between Rad and Radhika has a higher confidence score than the name match between hik and Radhika (without a starting letter match). The criterion engine 826 can set up rules to take the confidence score into consideration when computing the cost-based quota. For example, the criterion engine 826 may define criteria that vary the cost for a phone edge based on the confidence score associated with the phone edge, and computes the quota based on the varying costs.

In other instances, the criterion engine 826 receives attributes of an account from the attribute engine 822 and defines an attribute-based quota based on the attributes. In some instances, the criterion engine 826 defines an attribute-based quota based on the attributes including a name, a creation time, an age of the account, account health attributes (e.g., a reputation score), etc. For example, the criterion engine 826 assigns a first value for the first user to reflect that the creation time of the owner account associated with the first user is within a threshold period, and assigns a second value for the first user to reflect that the first user has a good reputation with a reputation score above a threshold score. The first value is smaller than the second value. The criterion engine 826 sets up rules to combine the first value and the second value into an attribute-based quota. For example, the attribute-based quota is a sum of the first and second values. In other instances, the criterion engine 826 defines the attribute-based quota based on the attributes regarding what update the owner account is doing on the information related to the contact account. For example, if the owner account associated with the first user repeatedly updates a contact name corresponding to a phone number as a result of attempting to obtain the correct contact name, the first user may be classified as an abuser. Such attribute may cause the criterion engine 826 to allocate a low quota to the first user.

In some other instances, the criterion engine 826 also sets up other criteria. For example, the criterion engine assigns a threshold time between a previous failure for providing a phone edge to the first user and a current request for the phone edge from the first user. The current request can only be handled when the time difference between the previous failure and the current request exceeds the threshold time. In another example, the criterion engine 826 assigns a threshold percentage about how many non-name-matching-edges can exist in a total amount of edges. Only if the percentage of the requested edges being non-name-matching-edges is below the threshold percentage, the requesting user may get a phone edge.

The criterion engine 826 can communicate with the abuse determination engine 826 to adjust the costs, the cost-based quota, the attribute-based quota and other criteria. For example, the criterion engine 826 can change the name-matching-edge-cost from ten to zero. The legitimate user therefore may get a phone edge without any cost. In another example, the criterion engine 826 increases the cost-based quota once the abuse determination engine 828 determines that the first user is an abuser. The criterion engine 826 sets up and adjusts criteria at real time. In some instances, the criterion engine 826 stores the criteria on the storage 810.

The abuse determination engine 828 can be software including routines for determining whether to provide information of a contact account to a first user responsive to a look-up request from the first user. In some instances, the abuse determination engine 828 can be a set of instructions executable by the processor 802 to provide the functionality described below for determining whether to provide information of a contact account to a first user responsive to a look-up request from the first user. In other instances, the abuse determination engine 828 can be stored in the memory 804 of the computing device 800 and can be accessible and executable by the processor 802. In some instances, the abuse determination engine 828 can be adapted for cooperation and communication with the processor 802 and other components of the computing device 800.

In some instances, the edge creation engine 824 receives a list of phone numbers in the address book of the first user and creates phone edges for these phone numbers by associating each phone number in the list with the corresponding contact account. At this point, the phone edges are created by the edge creation engine 824 in the back-end and have not yet been revealed to the first user. The edge creation engine 824 generates a request for the first user to read the phone edge. Responsive to receiving the request, the abuse determination engine 828 determines whether to provide the phone edge to the first user based at least one criterion defined by the criterion engine 826. In this way, the abuse determination engine 828 limits the number of phone edges that can return to the first user during the read time of the first user.

The abuse determination engine 828 uses a name matching algorithm to determine whether to provide a phone edge to a first user. The phone edge maps a phone number in the address book of the first user to an account of a second user (e.g., the contact account). The criteria used in the name matching algorithm include criteria about name matches (e.g., whether ignoring letter cases, whether there is a starting letter match, etc.), costs, a cost-based quota, etc.

In some instances, the abuse determination engine 828 determines whether there is a name corresponding to the phone number in the address book of the first user. If there is a name in the address book, the abuse determination engine 828 determines a level of match between the name and the account name of the second user, and computes an edge cost for the phone edge. For example, the abuse determination engine 828 determines a name-matching-edge-cost with a cost value zero for a first phone edge based on a full name match, and determines a partial-name-matching-edge-cost with a cost value 500 for a second phone edge based on a partial name match. If there is no name in the address book, the abuse determination engine 828 determines a non-name-matching-edge-cost for a phone edge with a cost value assigned by the criterion engine 826, for example, 10. In some instances, the abuse determination engine 828 also determines a confidence score for a name match and computes an edge cost based on the confidence score. For example, the abuse determination engine 828 determines a 0.9 confidence score for a partial name match between Jeni and Jennifer based on the criterion about a starting letter match. The abuse determination engine 828 also determines a 0.2 confidence score for a partial name match between hik and Radhika based on the criterion about a non-starting letter match. The "Jeni" and "hik" are in the address book of the first user. The "Jennifer" and "Radhika" are the actual contact account names. Based on the confidence scores, the abuse determination engine 828 determines a 550 partial-name-edge-matching cost for the phone edge mapping to Jennifer, and determines a 800 partial-name-edge-matching cost for the phone edge mapping to Radhika.

If the names match, the abuse determination engine 828 may determine that the corresponding phone edge, the request for obtaining this edge and the first user who requests this edge are legitimate. As a result, the first user can pay the name-matching-edge-cost to get the phone edge provided by the abuse determination engine 828. The name-matching-cost could be zero or a small number. If the names partially match, the abuse determination engine 828 may still provide the phone edge to the first user but the first user will get the phone edge at a higher cost, for example, a partial-matching-edge-cost 600. If the names do not match, it is not necessarily an abusive case but is likely to be an abusive case. It is possible that the abuse determination engine 828 will provide the phone edge to the first user, but the first user will get the phone edge at a highest cost, for example, a non-matching-edge-cost 1000.

In some instances, the abuse determination engine 828 also depends on a cost-based quota to determine whether to provide a phone edge to the first user. The abuse determination engine 828 computes a cost-based quota for the first user within a length of time. The abuse determination engine 828 then computes a quota usage within the length of time based on how many phone edges and what kind of phone edges have been requested by the first user within the length of time. The abuse determination engine 828 computes the cost-quota and the quota-usage based on the same criterion defined in the criterion engine 826. Responsive to receiving a request for a phone edge from the first user, the abuse determination engine 828 determines whether to provide the phone edge to the first user based on whether the quota usage exceeds the cost-based quota. For example, the criterion engine 826 defines that at most 100 name-matching-edges, 50 partial-matching-edges and 20 non-name-matching-edges can be allowed to the first user per day. The abuse determination engine 828 computes a 46k/day cost-based quota given the name-matching-edge-cost, the partial name-matching-edge-cost 10 and the non-name-matching-edge-cost being 10, 500 and 1000 respectively, i.e., the cost-based quota=100×10+50×500+20×1000=46000. The abuse determination engine 828 also computes a quota usage for the first user, for example, 90×10+80×500+5×1000=45900 based on 90 name-matching-edges, 80 partial-matching-edges and five non-name-matching-edges requested by the first user in a day. The first user has requested 90+80+5=175 phone edges. When the first user requests the $176^{th}$ partial-matching-edge in the day, the abuse determination engine 828 will not provide the $176^{th}$ phone edge to the first user since the quota usage including the $176^{th}$ phone edge is 90×10+81×500+5×1000=46400, which exceeds 46k.

In some instances, the abuse determination engine 828 determines, based on the cost-based quota, whether to change a mark annotated on a phone edge and determines whether to provide the phone edge to the first user based on whether the mark being changed. For example, the edge creation engine 824 annotates all phone edges with a "false" mark when creating the phone edges. The abuse determination engine 828 determines a quota on how many edges can be marked as "true" and returns only the phone edges with the "true" marker to the first user. In one example, the criterion engine 826 defines that all name-matching-edges can be marked as "true" with zero cost. The criterion engine 826 also defines that a maximum 100 non-matching-edges can be marked as "true" with a cost one. Upon the look-up requests from the first user, the abuse determination engine 828 can return all the name-matching-edges and a number of successful non-name-matching-edges. This number is less than 100. So the first user may pay 30 to get 1000 name-matching-edges and 30 non-name-matching-edges, but the first user cannot get one name-matching-edge and 101 non-name-matching-edges.

In addition to the cost-based quota, the abuse determination engine 828 also determines an attribute-based quota based on at least one criterion defined by the criterion engine 826. The at least one criterion are related to the attributes including a creation time of the owner account associated with the first user, a reputation score of the first user, what update the owner account is doing on the information related to the contact account, etc. For example, the abuse determination engine 828 gives Alice an attribute-based quota that is higher than the attribute-based quota assigned to Andrew because the reputation score of Alice is higher than the reputation score of Andrew. The abuse determination engine 828 determines whether to provide a phone edge to the first user based on the attribute-based quota. For example, the deterioration of the first user's reputation (e.g., due to some abusive behaviors detected by other abuse detection system that is integrated into the system 700) may cause an attribute-based quota being exceeded. As a result, the abuse determination engine 828 will not provide a phone edge to the first user responsive to a look-up request from the first user.

In some instances, the abuse determination engine 828 determines whether there was a failure to provide the phone edge to the first user prior to the current request for the phone edge from the first user. The failure may be caused by failing to match the name in the address book and the actual social network account name or failing to meet the quota criterion. If there was a failure, the abuse determination engine 828 computes a time difference between the time that the failure occurred and the time that the current request was received, and determines whether the time difference exceeds a threshold time, e.g., a week. The abuse determination engine 828 responds to the current request only when the time difference exceeding the threshold time. So if the abuse determination engine 828 fails to provide the contact account information to a first user responsive to receiving 100 look-up requests from the first user today, the abuse determination engine 828 will not need to handle the same 100 look-up requests in the next couple of days. The abuse determination engine 828 therefore gains efficiency by limiting the re-try times. In other instances, the abuse determination engine 828 also limits the number of look-up requests received from the first user in a time period.

In some instances, responsive to an automatic request generated by the edge creation engine 824, the abuse determination engine 828 determines an overall quota based on the cost-based quota and the attribute-based quota, and determines whether to provide a phone edge to a first user based on at least one of the cost-based quota, the attribute-based quota and the overall quota. In other instances, responsive to a direct request from the first user (e.g., by entering a phone name in a search box), the abuse determination engine 828 uses the attribute-based quota to determine whether to provide information of a contact account to a first user. In this scenario, the abuse determination engine 828 processes the direct request without communicating the edge creation engine 824. Since no phone edge is created, the abuse determination engine 828 may not use the edge-related cost and cost-based quota to determine whether to return contact account information to the first user.

The abuse determination engine 828 determines whether a request for looking up a contact account using a phone number for a first user is legitimate based on the costs, the cost-based quota and the attribute-based quota described above. For example, the abuse determination engine 828 determines that a first request for a name-matching-edge is legitimate, and determines that a second request is an abusive request since a percentage of non-name-matching-edges requested by the first user prior to the second request and within a time period exceeds a threshold percentage. In some instances, the abuse determination engine 828 also determines whether the first user requesting a contact account is a legitimate user or an abuser. For example, the abuse determination engine 828 determines that the first user is an abuser if abusive requests from the first user within a time period exceeds a threshold.

The abuse determination engine 828 can adjust the costs, the cost-based quota and the attribute-based quota based on whether a request being a legitimate request or whether a user being a legitimate user. For the legitimate request or user, the abuse determination engine 828 can decrease the costs or increase the costs or quotas to benefit the user. For the abusive request or user, the abuse determination engine 828 can lower the costs or quotas to penalize the user. For example, if the abuse determination engine 828 determines that the first user is a legitimate user and the name in the address book of the first user all match to the actual social network names, the abuse determination engine 828 can upgrade the cost-quota for the first user from 300k/month to 600k/month. However, if none of the names in the address book of the first user matches the actual social network account names, the abuse determination engine 828 can decrease the cost-quota for the first user from 300k/month to 10k/month, and increases the non-match-edge-cost for the first user from 1000 to 5000 as well. By differentiating the requests, the abuse determination engine 828 ensures that legitimate users get as much benefit as possible and at the same time ensures that abusers are penalized heavily.

The notification engine 830 can be software including routines for notifying the first user whether the information of a contact account will be provided to the first user. In some instances, the notification engine 830 can be a set of instructions executable by the processor 802 to provide the functionality described below for notifying the first user whether the information of a contact account will be provided to the first user. In other instances, the notification engine 830 can be stored in the memory 804 of the computing device 800 and can be accessible and executable by the processor 802. In some instances, the notification engine 830 can be adapted for cooperation and communication with the processor 802 and other components of the computing device 800.

The notification engine 830 receives the determination as to whether to provide the contact account information associated with a second user to the first user from the abuse determination engine 828 and notifies the first user of the determination. For a positive determination, the notification includes the account name of the second user and other information including a link to the user profile associated with the second user, a photo of the second user, a link for the first user connecting with the second user, etc. For a negative determination, the notification includes an explanation about why the abuse determination engine 828 rejected the first user's request for the contact account information of the second user. For example, the notification engine 830 sends a notification indicating that the first user cannot get the requested contact account information because the first user fails to meet the quota criterion. The notification may also include other information, e.g., a reminder of when the first user can try again for looking up the same contact account information.

In some instances, the notification can take a variety of formats. The notification can be a pop-up window on a mobile phone, an overlay presented on a web page displayed to the first user, an electronic message, etc. In some instances, the notification engine 830 stores the notifications in the storage 810.

In the following description, for purposes of explanation, numerous specific details are set forth in order to provide a thorough understanding of the specification. It will be apparent, however, to one skilled in the art that the technology can be practiced without these specific details. In other instances, structures and devices are shown in block diagram form in order to avoid obscuring the description. For example, the specification is described in some instances above with reference to user interfaces and particular hardware. However, the description applies to any type of computing device that can receive data and commands, and any peripheral devices providing services.

Reference in the specification to "some instances" or "an embodiment" means that a particular feature, structure, or characteristic described in connection with the embodiment is included in at least some instances of the description. The appearances of the phrase "in some instances" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or embodiments containing both hardware and software elements. In some instances, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or social network data stores through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the engines, routines, features, attributes, methodologies and other aspects are not mandatory or significant, and the mechanisms that implement the specification or its features may have different names, divisions and/or formats. Furthermore, as will be apparent to one of ordinary skill in the relevant art, the engines, routines, features, attributes, methodologies and other aspects of the disclosure can be implemented as software, hardware, firmware or any combination of the three. Also, wherever a component, an example of which is a engine, of the specification is implemented as software, the component can be implemented as a standalone program, as part of a larger program, as a plurality of separate programs, as a statically or dynamically linked library, as a kernel loadable engine, as a device driver, and/or in every and any other way known now or in the future to those of ordinary skill in the art of computer programming Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, using one or more processors, an address book of a first user, the address book including a phone number that belongs to a second user;

creating, using one or more processors, a phone edge by associating the phone number in the address book with an account of the second user;

receiving, using one or more processors, a request including the phone number from the first user for obtaining the account associated with the phone number;

determining, using one or more processors, an edge cost associated with the phone edge for the first user;

determining whether to provide the phone edge to the first user based on the edge cost; and providing the phone edge to the first user responsive to a positive determination.

2. The method of claim 1, wherein determining the edge cost associated with the phone edge further comprises:

determining whether there is a name corresponding to the phone number in the address book;

determining a level of match between the name in the address book and an account name of the second user; and computing the edge cost associated with the phone edge for the first user based on whether the name corresponding to the phone number is in the address book and the level of match between the name in the address book and the account name of the second user.

3. The method of claim 1, further comprising:

determining a plurality of edge costs associated with a plurality of phone edges that are created for a plurality of phone numbers in the address book of the first user;

computing a cost-based quota for the first user based on the plurality of edge costs; and wherein determining whether to provide the phone edge to the first user is also based on the quota.

4. The method of claim 3, further comprising adjusting the cost-based quota for the first user.

5. The method of claim 1, further comprising:

collecting at least one attribute for an account of the first user;

determining an attribute-based quota for the first user based on the at least one attribute; and wherein determining whether to provide the phone edge to the first user is based on the attribute-based quota.

6. The method of claim 5, further comprising adjusting the attribute-based quota for the first user.

7. The method of claim 3, further comprising:

annotating the phone edge with a mark;

determining whether to change the mark of the phone edge based on the cost-based quota; and wherein providing the phone edge to the first user is responsive to the mark being changed.

8. The method of claim 1, further comprising:

computing a time difference between the request and a failure to provide the phone edge to the first user prior to the request;

determining whether the time difference exceeds a threshold time; and wherein determining whether to provide the phone edge to the first user is responsive to the time interval exceeding the threshold time.

9. The method of claim 1, further comprising notifying the first user of whether the phone edge being provided to the first user.

10. A computer program product comprising a non-transitory computer usable medium including a computer readable program, wherein the computer readable program when executed on a computer causes the computer to:

receive an address book of a first user, the address book including a phone number that belongs to a second user;

create a phone edge by associating the phone number in the address book with an account of the second user;

receive a request including the phone number from the first user for obtaining the account associated with the phone number;

determine an edge cost associated with the phone edge for the first user;

determine whether to provide the phone edge to the first user based on the edge cost; and provide the phone edge to the first user responsive to a positive determination.

11. The computer program product of claim 10, wherein determining the edge cost associated with the phone edge further comprises:

determining whether there is a name corresponding to the phone number in the address book;

determining a level of match between the name in the address book and an account name of the second user; and computing the edge cost associated with the phone edge for the first user based on whether the name corresponding to the phone number is in the address book and the level of match between the name in the address book and the account name of the second user.

12. The computer program product of claim 10, wherein the computer readable program when executed on the computer further causes the computer to:

determine a plurality of edge costs associated with a plurality of phone edges that are created for a plurality of phone numbers in the address book of the first user;

compute a cost-based quota for the first user based on the plurality of edge costs; and wherein determining whether to provide the phone edge to the first user is also based on the quota.

13. The computer program product of claim 12, wherein the computer readable program when executed on the computer further causes the computer to adjust the cost-based quota for the first user.

14. The computer program product of claim 10, wherein the computer readable program when executed on the computer further causes the computer to:

collect at least one attribute for an account of the first user;

determine an attribute-based quota for the first user based on the at least one attribute; and wherein determining whether to provide the phone edge to the first user is based on the attribute-based quota.

15. The computer program product of claim 14, wherein the computer readable program when executed on the computer further causes the computer to adjust the attribute-based quota for the first user.

16. A system comprising:

one or more processors; and a memory storing instructions that, when executed, cause the system to:

receive an address book of a first user, the address book including a phone number that belongs to a second user;

create a phone edge by associating the phone number in the address book with an account of the second user;

receive a request including the phone number from the first user for obtaining the account associated with the phone number;

determine an edge cost associated with the phone edge for the first user;

determine whether to provide the phone edge to the first user based on the edge cost; and provide the phone edge to the first user responsive to a positive determination.

17. The system of claim 16, wherein determining the edge cost associated with the phone edge further comprises:

determining whether there is a name corresponding to the phone number in the address book;

determining a level of match between the name in the address book and an account name of the second user; and computing the edge cost associated with the phone edge for the first user based on whether the name corresponding to the phone number is in the address book and the level of match between the name in the address book and the account name of the second user.

18. The system of claim 16, wherein instructions that, when executed, further cause the system to:

determine a plurality of edge costs associated with a plurality of phone edges that are created for a plurality of phone numbers in the address book of the first user;

compute a cost-based quota for the first user based on the plurality of edge costs; and wherein determining whether to provide the phone edge to the first user is also based on the quota.

19. The system of claim 16, wherein instructions that, when executed, further cause the system to:

collect at least one attribute for an account of the first user;

determine an attribute-based quota for the first user based on the at least one attribute; and wherein determining whether to provide the phone edge to the first user is based on the attribute-based quota.

20. The system of claim 16, wherein instructions that, when executed, further cause the system to notify the first user of whether the phone edge being provided to the first user.

* * * * *